US006535868B1

(12) United States Patent
Galeazzi et al.

(10) Patent No.: US 6,535,868 B1
(45) Date of Patent: Mar. 18, 2003

(54) METHOD AND APPARATUS FOR MANAGING METADATA IN A DATABASE MANAGEMENT SYSTEM

(76) Inventors: Debra A. Galeazzi, 11624 Springside Rd., San Diego, CA (US) 92128; Richard G. Stellwagen, Jr., 13035 Camino del Valle, Poway, CA (US) 92064; Bruce A. McLean, 11733 La Colina Rd., San Diego, CA (US) 92131; Kristen Roi Mower, 120 via Coronado, Rancho Santa Fe, CA (US) 92091-4461

( * ) Notice: Subject to any disclaimer, the term of this patent is extended or adjusted under 35 U.S.C. 154(b) by 0 days.

(21) Appl. No.: 09/141,239

(22) Filed: Aug. 27, 1998

(51) Int. Cl.[7] .............................................. G06F 17/30
(52) U.S. Cl. .............................. 707/2; 707/10; 707/100
(58) Field of Search ............................ 707/8, 1–2, 10, 707/200–202, 100

(56) References Cited

U.S. PATENT DOCUMENTS

| 5,644,764 | A | * | 7/1997 | Johnson et al. ............. 707/103 |
| 5,778,370 | A | * | 7/1998 | Emerson ..................... 707/100 |
| 5,874,955 | A | * | 2/1999 | Rowoitz et al. ............ 345/339 |
| 5,930,794 | A | * | 7/1999 | Linenbach et al. ......... 707/100 |
| 5,970,464 | A | * | 10/1999 | Apte et al. ..................... 705/4 |
| 6,003,039 | A | * | 12/1999 | Barry et al. ................ 707/103 |
| 6,044,374 | A | * | 3/2000 | Nesamoney et al. .......... 707/10 |
| 6,081,811 | A | * | 6/2000 | Nilsson ....................... 707/201 |
| 6,105,026 | A | * | 8/2000 | Kruglikou et al. ............. 707/8 |

OTHER PUBLICATIONS

"The Implementation of POSTGRES," Michael Stonebraker et al., IEEE Transactions on Knowledge and Data Engineering, vol. 2, issue 11, Mar., 1990, pp. 124–142.*

Abbadi, A.E. et al., "An Efficient, Fault–Tolerant Protocol for Replicated Data Management". In *The Synthesizer Generator: A System for Constructing Language–Based Editors*, D. Gries, Editor, Springer–Verlag New York Inc., 1989, pp. 577–591.

Bernstein, P.A. et al., "Concurrency Control in Distributed Database Systems". In *The Synthesizer Generator: A System for Constructing Language–Based Editors*, D. Gries, Editor, Springer–Verlag New York Inc., 1989, pp. 548–566.

Dayal, U. et al., "Organizing Long–Running Activities with Triggers and Transactions". In *The Synthesizer Generator: A System for Constructing Language–Based Editors*, D. Gries, Editor, Springer–Verlag New York Inc., 1989, pp. 324–334.

(List continued on next page.)

*Primary Examiner*—Hosain T. Alam (57) ABSTRACT

A method, apparatus, and article of manufacture for managing metadata in a database management system is disclosed. The method comprises the steps of accepting a command in the database management system that implicates a metadata modification and providing that command to a metadata service, parsing the command to determine if the command requires a metadata modification, accessing a rule set defining rules for modifying the metadata when indicated by the parsed commands, and enforcing the rule defined in the rule set. The article of manufacture comprises a program storage device with a medium tangibly embodying processing instructions for performing the foregoing operations. The apparatus comprises a means for performing the foregoing steps. The article of manufacture comprises a means for performing these steps, including a computer implementing a database management system. The functions herein described can be performed by a special purpose processor, a single multipurpose computer. Alternatively, the operations disclosed herein can be performed among a number of computers communicatively interconnected by a network such as a local area network, wide area network, or the Internet.

39 Claims, 9 Drawing Sheets

OTHER PUBLICATIONS

Gray, J., "Transparency in its Place—The Case Against Transparent Access to Geographically Distributed Data". In *The Synthesizer Generator: A System for Constructing Language–Based Editors,* D. Gries, Editor, Springer–Verlag New York Inc., 1989, pp. 592–602.

Gray, J.N. et al., "Granularity of Locks and Degrees of Consistency in a Shared Data Base." In *The Synthesizer Generator: A System for Constructing Language–Based Editors,* D. Gries, Editor, Springer–Verlag New York Inc., 1989, pp. 181–208.

Mackert, L.F. et al., "R* Optimizer Validation and Performance Evaluation for Distributed Queries". In *The Synthesizer Generator: A System for Constructing Language –Based Editors,* D. Gries, Editor, Springer–Verlag New York Inc., 1989, pp. 537–547.

McCarthy, D.R. et al., "The Architecture of an Active Data Base Management System". In *The Synthesizer Generator: A System for Constructing Language–Based Editors,* D. Gries, Editor, Springer–Verlag New York Inc., 1989, pp. 373–382.

Mohan, C. et al., "Transaction Mangement in the R# Distributed Database Management System". In *The Synthesizer Generator: A System for Constructing Language–Based Editors,* D. Gries, Editor, Springer–Verlag New York Inc., 1989, pp. 567–576.

Stonebraker, M., "The Design of the Postgres Storage System." In *The Synthesizer Generator: A System for Constructing Language–Based Editors,* D. Gries, Editor, Springer–Verlag New York Inc., 1989, pp. 278–289.

Stonebraker, M. et al., "On Rules, Procedures, Caching and Views in Data Base Systems". In *The Synthesizer Generator: A System for Constructing Language–Based Editors,* D. Gries, Editor, Springer–Verlag New York Inc., 1989, pp. 363–372.

Stonebraker, M. et al., "The Postgres Next–Generation Database Management System". In *The Synthesizer Generator: A System for Constructing Language–Based Editors,* D. Gries, Editor, Springer–Verlag New York Inc., 1989, pp. 873–887.

Widom, J. et al., "Set–Oriented production Rules in Relational Database Systems." In *The Synthesizer Generator: A System for Constructing Language–Based Editors,* D. Gries, Editor, Springer–Verlag New York Inc., 1989, pp. 351–362.

Williams, R. et al., "R*: An Overview of the Architecture." In *The Synthesizer Generator: A System for Constructing Language–Based Editors,* D. Gries, Editor, Springer–Verlag New York Inc., 1989, pp. 515–536.

* cited by examiner-

METHOD AND APPARATUS FOR MANAGING METADATA IN A DATABASE MANAGEMENT SYSTEM

BACKGROUND OF THE INVENTION

1. Field of the Invention

The present invention relates to systems and methods of storing and retrieving data, and in particular to a method and system for managing metadata in a database management system.

2. Description of the Related Art

Large-scale integrated database management systems provide an efficient, consistent, and secure means for storing and retrieving vast amounts of data. This ability to manage massive amounts of information has become a virtual necessity in business today.

Increasingly, database management systems are required to store and retrieve wide varieties of data To assist in this task, a class of data which describes characteristics of other data in the database management system has been described. This data class is known as "metadata."

In a centralized data warehouse, the metadata for any given application software component consists of three parts: (1) definitions that are meaningful only to the component itself, (2) definitions that are usable by a set of components different from the one which registered the definition but which are defined in terms of base definitions that affect a still larger set of components, and (3) base definitions that must be considered a system-wide common resource. Typically, a single common store forms a metadata repository which is used as a reference database by multiple subscribing components.

Providing single metadata source for multiple data subscribers has several advantages, including direct data exchange, promoting interoperability and integration of applications, sharing common data, and consolidating resources for persistence, backup, and browsing. However, this requires metadata integrity to avoid inconsistencies in a connected set of metadata items. Such inconsistencies can occur for example, when a writer application modifies some part of the information while a reader application still depends on the information. In the simplest case, metadata integrity is needed provide coordinated access so that the subscriber application is guaranteed an unchangeable metadata domain while a connection is active between the application and the metadata store. Under a broader definition of metadata integrity, metadata access is coordinated between two different resource users, even in cases where the two resource users do not demand access at the same time.

While metadata integrity is needed, it must not be more burdensome than not having common metadata at all. Further, it must operate under a variety of timeframes and through potential system recoveries, and should allow owners of applications using metadata to discover existing data dependencies before changes to the metadata are made. The present invention satisfies that need.

SUMMARY OF THE INVENTION

To address the requirements described above, the present invention discloses a method, apparatus, article of manufacture, and a memory structure for managing metadata in a database management system.

The method comprises the steps of accepting a command potentially modifying the metadata in the database management system from a system component, transmitting the command to a metadata service, parsing the command to determine if the metadata will be modified, accessing a rule set when modification of the metadata is required, and enforcing the rule described in the rule set. The article of manufacture comprises a data storage device tangibly embodying instructions to perform the method steps described above.

The apparatus comprises a means for performing the above operations. In one embodiment, this includes a metadata service that accepts commands from the database management system, reads a rule set stored in the database management system, and enforces that rule set. Many different embodiments of the invention employing different rule sets are disclosed, including predicate and subsequent rules, and rule type categorizations.

The present invention utilizes an extended transaction protocol. Unlike a generic transaction, where system is guaranteed before and after the transaction, the present invention assures metadata security within the boundary of the transaction, and activities are sequenced under management so that system consistency is assured at every stage.

The foregoing provides the advantages metadata management, while minimizing the burden on the system in enforcing the management structure. The disclosed technique of locking a metadata version for a given subscriber component only as intrusive as necessary to implement the necessary management rules. A pre-programmed response to a metadata change notice may be associated with a change group. Also, a change group may be defined not only by enumeration of parts, but by inheritance rules. Using the present invention, owners of applications and metadata can discover existing dependencies before making metadata changes. The present invention also allows the protocol to operate over a variety of timeframes and through potential system recoveries. In addition to providing both programmable and interactive responses to change requests, the present invention assures that the notification of proposed changes will survive system failures and will be delivered to dependent subscribers following a system recovery.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
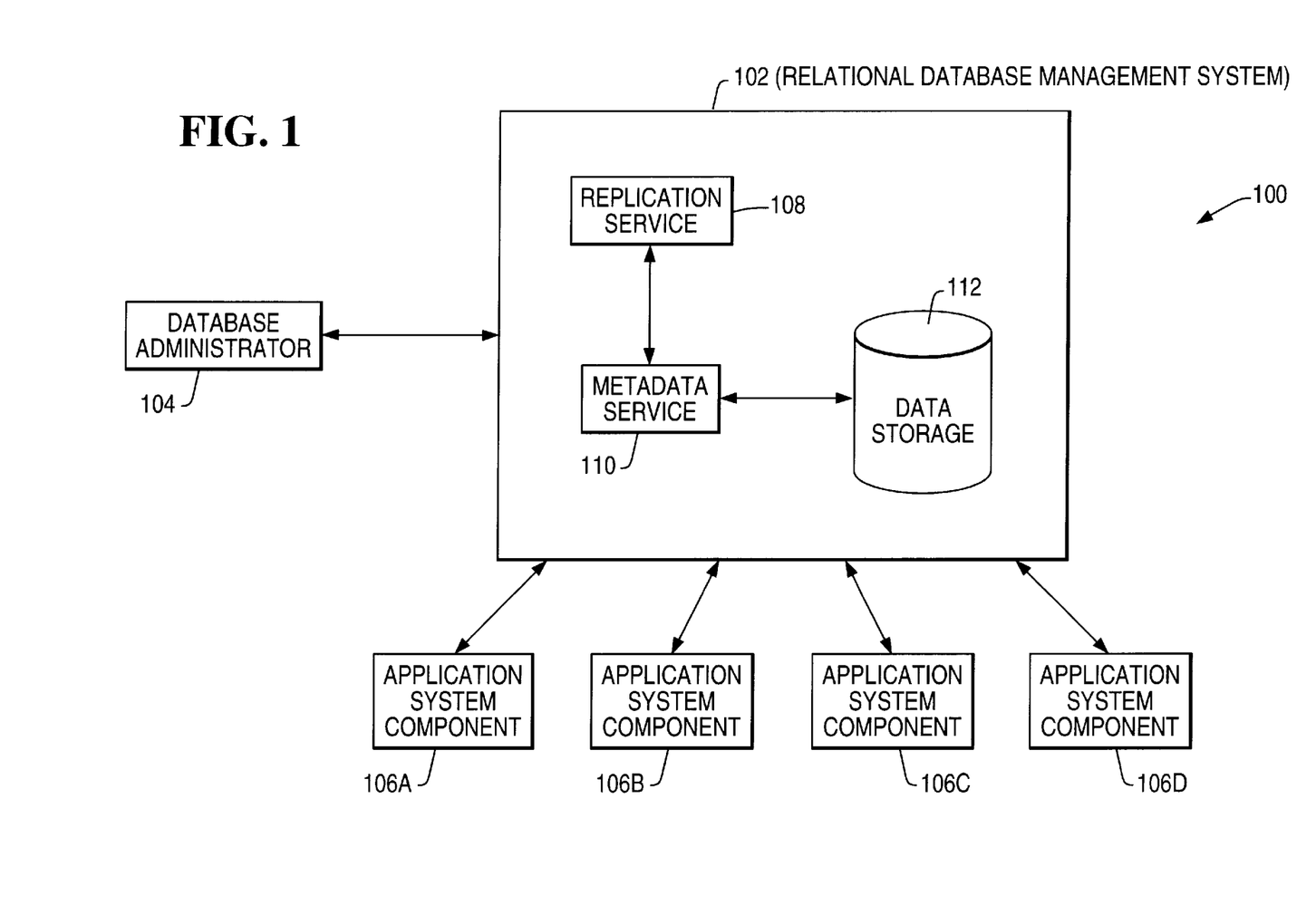
FIG. 1 is a block diagram showing a hardware environment implementing one embodiment of the present invention.

FIG. 1 is a block diagram showing a hardware environment implementing one embodiment of the database system of present invention. The database system 100 comprises a relational database management system 102, which interfaces with a system component such as a database administrator (DBA) 104 and a plurality of application/system components 106A–106B (hereinafter collectively referred to as applications 106). Applications 106 communicate with the relational database management system 102 to store and retrieve data, under the administrative control of the database administrator 104. Applications 106 as well as the database administrator 104 can be implemented on the same computer subsystem as the relational database management system 102, or may be implemented on separate computers, with commands and data passing through an intranet, LAN, internet, or other communication medium.

The relational database management system 102 comprises a data storage device 112, which stores data resident in the relational database management system 102. Data storage device 112 may also store instructions for performing the operations of the relational database management system 102 and the functions performed by the system components therein. Alternatively or in combination, other program storage devices tangibly embodying program steps to perform processor instructions such as CD ROMs, read/writeable CD ROMs, floppy disks, tape drives, magneto-optical storage devices, or similar device may be used.

The relational database management system 102 also comprises a replication service 108 for replicating data within the database system 100 as required. The replication service 108 also provides an interface with a metadata service 110, which is communicatively coupled to the data storage device 112 to store and retrieve data and instructions. The metadata service 110 is a warehouse component that manages a central metadata repository.

Figure 2:
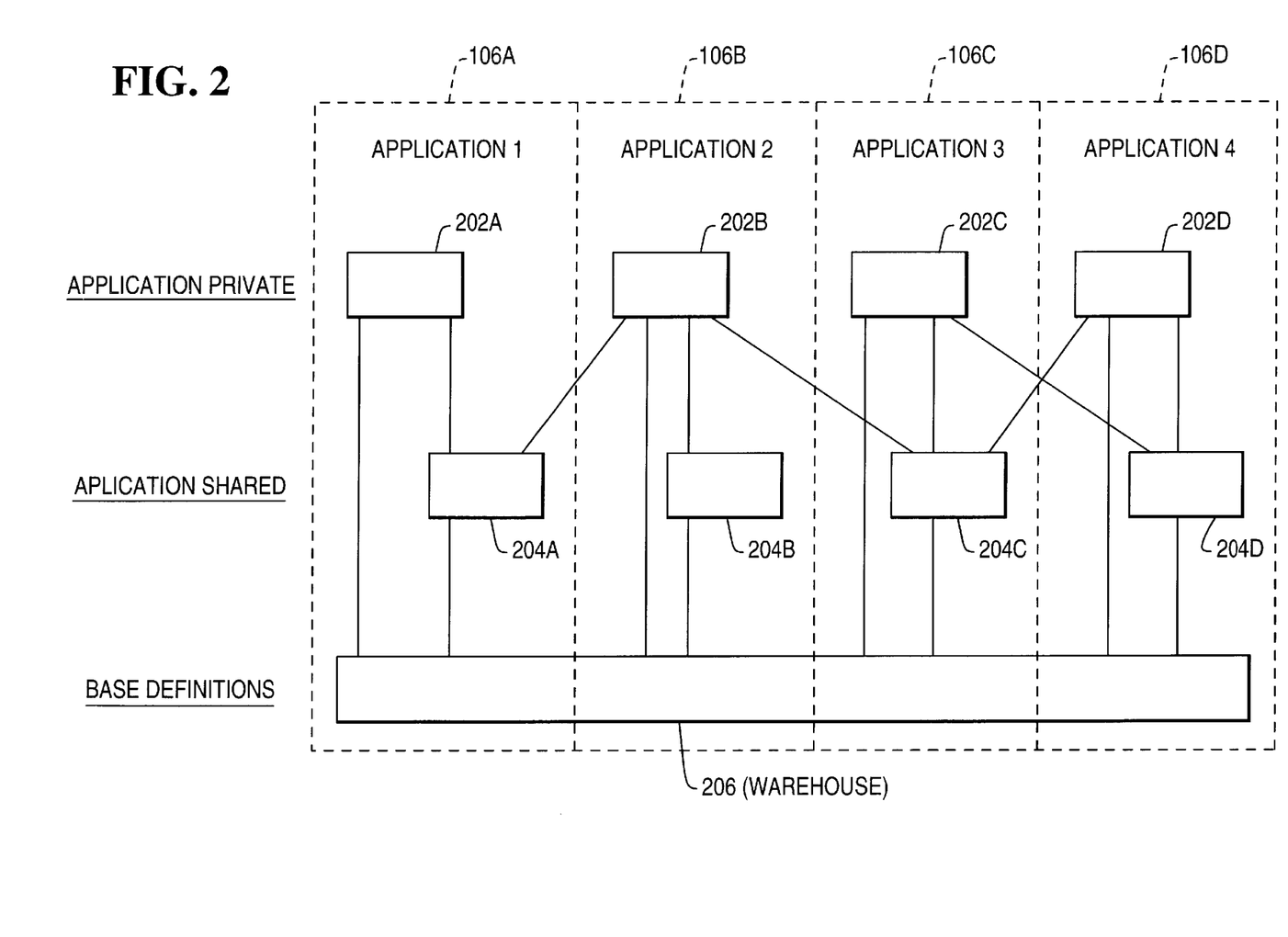
FIG. 2 is a flow chart showing how different levels of metadata may be shared between a plurality of applications or system components.

FIG. 2 is a diagram showing how different levels of metadata may be shared between the applications 106A–106D. Associated with each application is private metadata 202A–202D that is not shared with other applications and shared metadata 204A–204D, which is shared with other applications. Also, base definitions 206 may be shared among all applications. For example, if application 3 106C is an on-line analytical processing (OLAP) server, and application 4 106D is a data mining too, the metadata may be shared as indicated in Table 1 below.

TABLE 1

|  | Application 3 OLAP Server | Application 4 Data Mining Tool |
|---|---|---|
| Private Metadata | measures | formulas |
| Shared Metadata | Models for multi-dimensional (hypercube) display | Models for time-series analysis |
| Base Definitions | TERADATA metadata | |

Figure 3A:
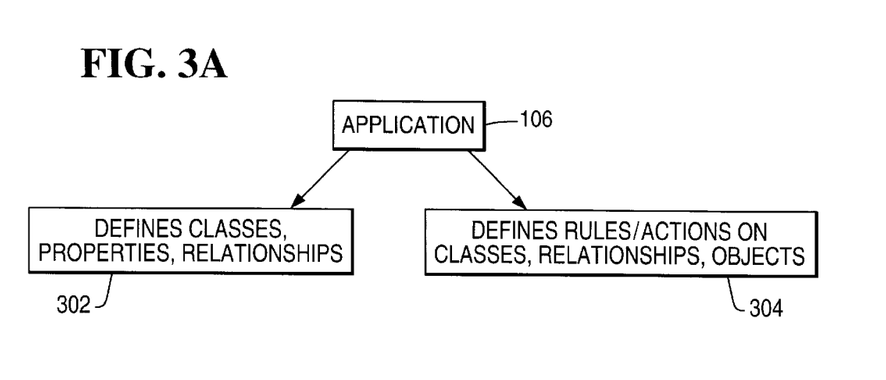
FIGS. 3A–3C are diagrams showing an example of how an application defines and accesses metadata.
Figure 3B:
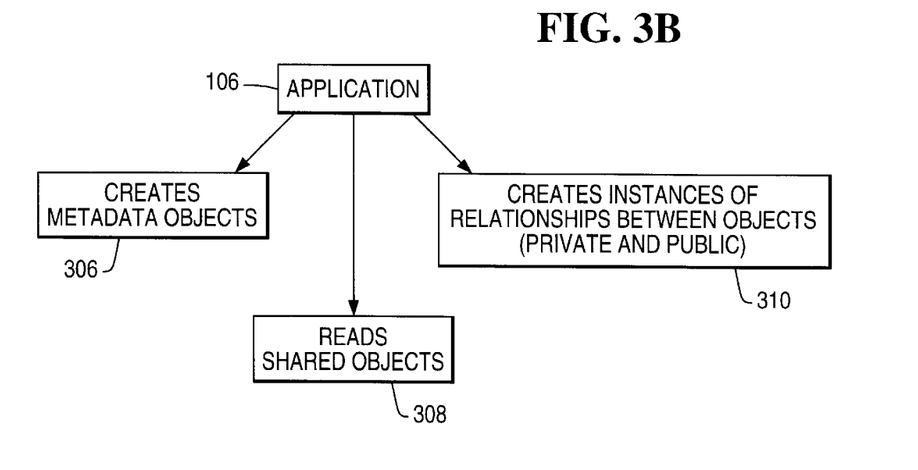
Figure 3C:
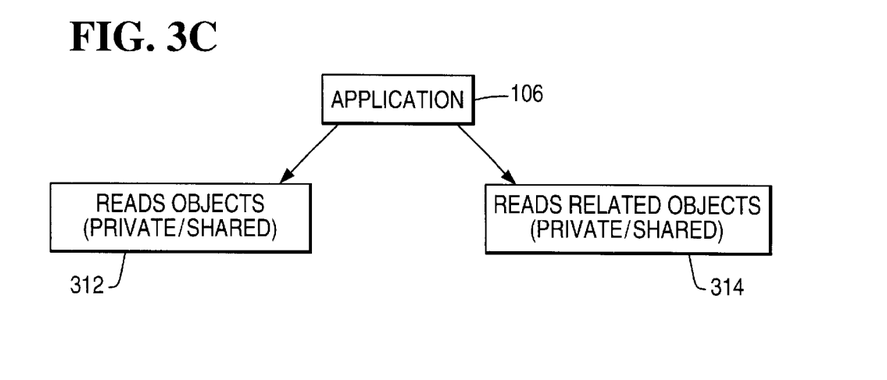

FIGS. 3A–3C are diagrams showing how an application 106 defines and accesses metadata. FIG. 3A illustrates the application 106 defining an application information model. This includes block 302, which depicts defining classes, properties, and relationships associated with the data, and block 304, which depicts the application 106 defining rules/actions on classes, relationships, and objects. FIG. 3B illustrates the application 106 creating metadata. This involves creating metadata objects, as shown in block 306, reading shared objects as shown in block 308 and creating instances of relationships between public and private objects as shown in block 310. FIG. 3C illustrates the application 106 reading metadata. This includes reading private and shared objects as well as related objects, as shown in blocks 312 and 314.

Figure 4:
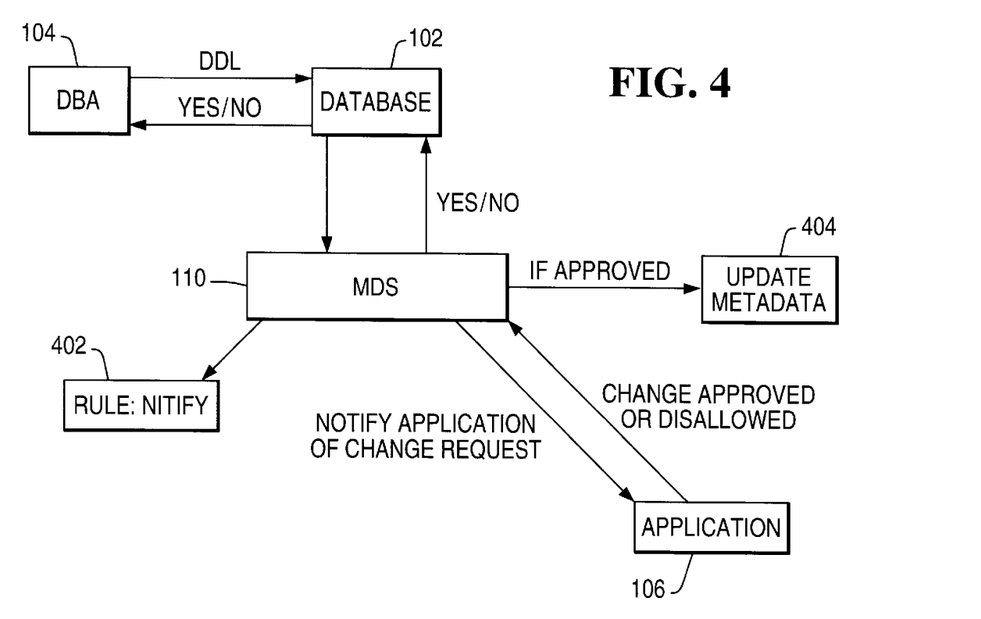
FIG. 4 is a diagram showing an operational flow implementing a dynamic notification rule type.

FIG. 4 is a diagram showing an operational flow implementing a dynamic notification rule type. The operational flow begins when the database administrator 104 transmits a command, typically in a data definition language, to the database 102. The command may include a command to change the schema of the database 102, alter a table, or alter a column of a table therein. The command is sent to a metadata services module 110, which accesses a rule database or set 402 stored in database 102 in the data storage 112. Rules are defined with respect to the change associated with the command and may apply either to specific objects or classes of objects. A record is associated with each rule to indicate the action(s) that must be taken in response to the command. In the illustrated case, a notification rule is imposed. Therefore, for each rule, an associated notification record is created and maintained which specifies which applications 106 will be notified and how they are to be notified.

In the illustrated embodiment, the command invokes a rule which requires affected applications 106 to be notified of the metadata changes which would result from the command. The command is accepted by the metadata services module (MDS) 110, and the metadata changes associated with the command are determined. The rule set 402 is accessed to determine which applications 106 need be notified of the proposed change, and how they are to be notified. Applications 106 on the notification list may be specified individually, or according to a classification. Thereafter, the notification of the change is sent to the application 106 from the MDS. The notification includes, for example the entity making the request and the change requested. In one embodiment, the requested change is specified in the data description language that was obtained from the database administrator 104. Thereafter, the application 106 determines whether the change should be permitted. This can be performed manually via a user interface, or can be performed without user intervention by the application 106 itself. A message indicating whether the change is permitted or not is then transmitted from the application 106 to the MDS 110. If the change is permitted, the metadata is updated as shown in block 404. The database 102 is then sent a message from the MDS 110, to command the database 102 to update its data in accordance with the approved change. Finally, a message is sent to the database administrator 104 indicating that the change was approved and made.

Figure 5:
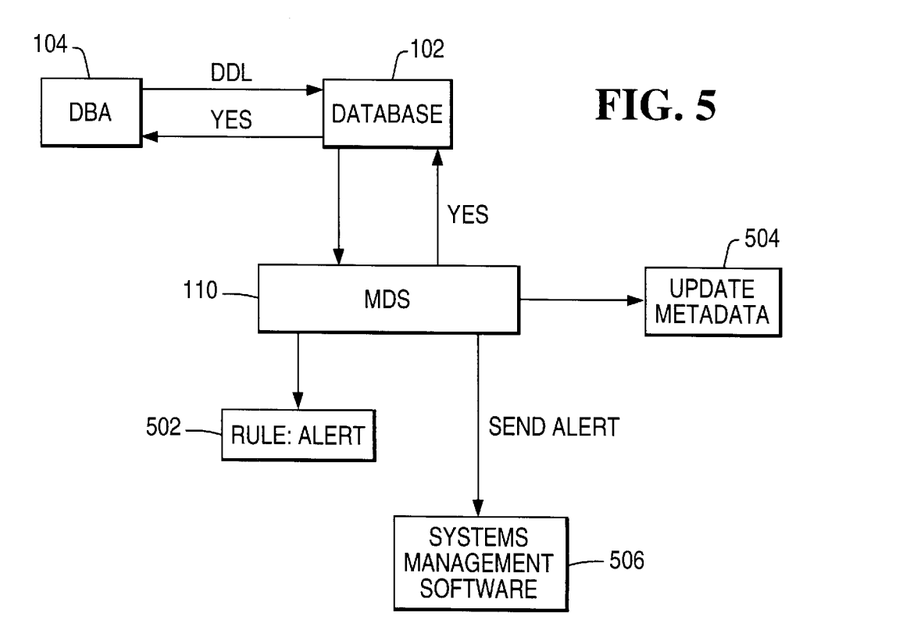
FIG. 5 is a diagram showing an operational flow implementing an alert rule type.

FIG. 5 is a diagram showing an operational flow implementing an alert rule type. The operational flow begins when the database administrator 104 transmits a command, typically in a data definition language, to the database 102. As with the notification rule type, the command may effect a change in the schema of the database 102, alter a table, or alter a column or row of a table therein. The command is sent to the MDS 110, which access the rule database 402. Here, the rule associated with the command is one that requires alerts sending alerts 502 to the affected components identified in the rule database 402. Unlike the notification operations described earlier, the affected applications and system components, including the system management software 506, cannot disapprove or disallow the proposed change. Instead, they are simply notified that the change will occur, and the MDS 110 updates the metadata after the alert is transmitted. As with notification, the alert rule confirms that the metadata was changed with a message sent via the database 102 to the DBA 104.

Figure 6A:
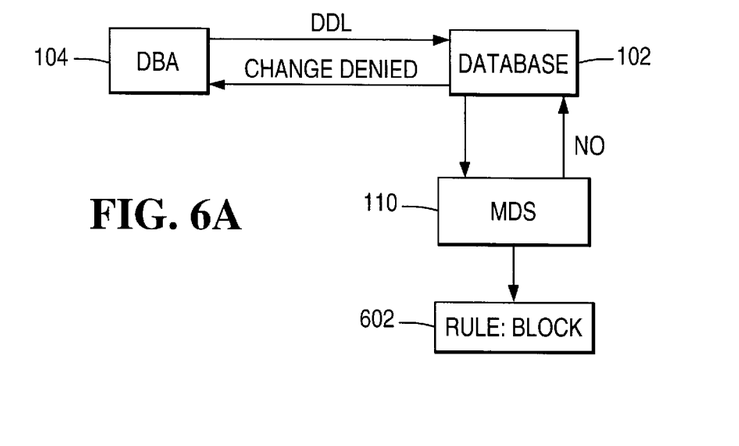
FIGS. 6A–6C are diagrams showing operational flows implementing a blocking rule and the suspension of the blocking rule by the database administrator.
Figure 6B:
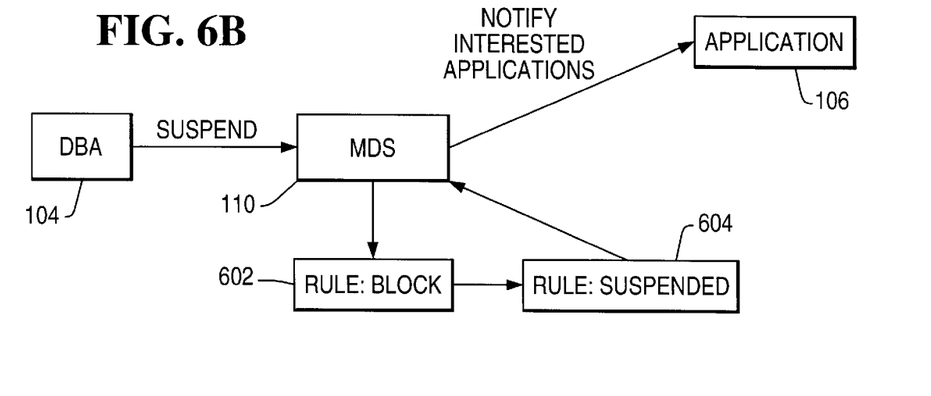
Figure 6C:
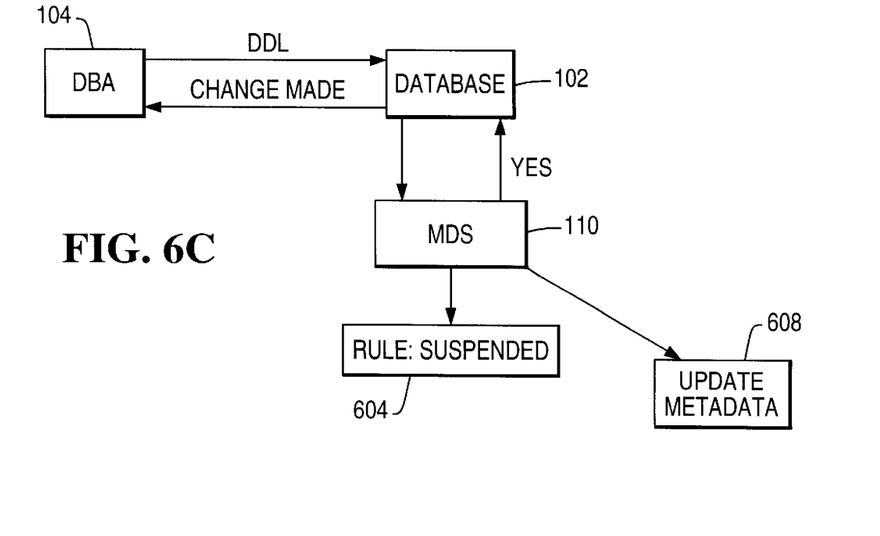

FIGS. 6A–6C are diagrams showing operational flows implementing a blocking rule and the suspension of the blocking rule by the DBA 104. Beginning with FIG. 6A, the DBA 104 submits a command to the database 102. This command is forwarded to the MDS 110, which accesses the rule set 402 to determine whether the block rule 602 will be imposed. If the block rule is imposed, the MDS denies the change, and a message indicating as such is returned to the DBA 104.

FIG. 6B illustrates an operational flow permitting the DBA 104 to suspend enforcement of the blocking rule 602. First, the DBA 104 transmits a suspend message to the MDS 110. In one embodiment, the transmission of the suspend message is predicated on a password entry by the DBA 104, or by other suitable security procedure. In another embodiment, the suspend message includes a password, and the MDS 110 checks to assure that the proper password has been entered before proceeding to suspend the rule. If the security and authority of the source of the suspend message is established, the MDS then suspends the blocking rule 602 formerly imposed. After the blocking rule 602 is suspended 604, interested applications 106 are notified that the rule is no longer in effect.

FIG. 6C illustrates an operational flow implementing the suspended blocking rule 604. After the DBA 104 has requested and obtained suspension of the blocking rule 602, it again sends a command to the database 102. This command is forwarded to the MDS 110. The MDS accesses the rule set, and determines that the rule implicated by the command from the DBA 104 has been suspended. Since the rule has been suspended, the MDS 110 updates the metadata 608 without further intervention.

Figure 7A:
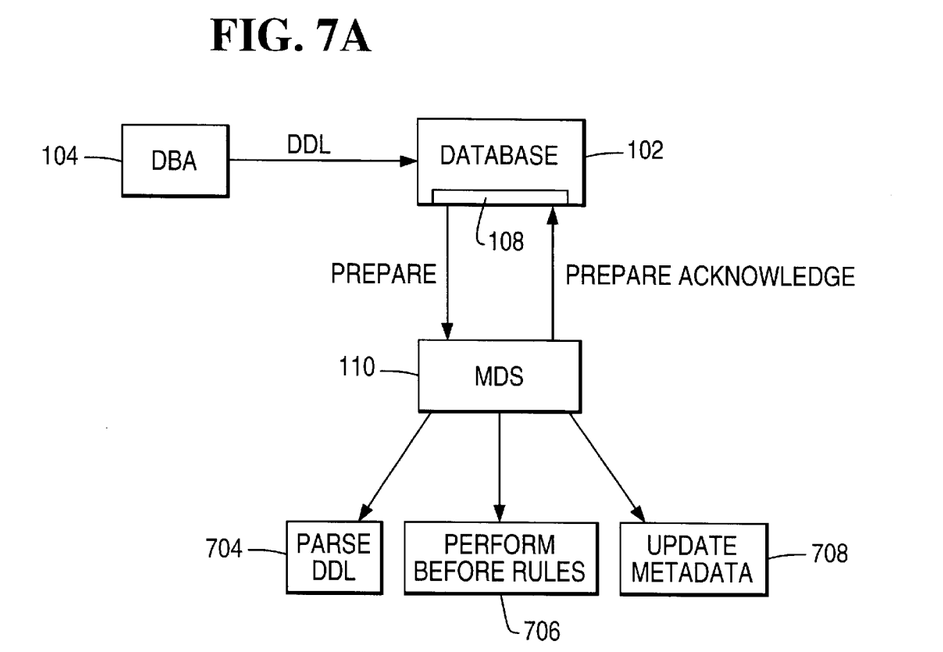
FIGS. 7A–7B are diagrams illustrating a two-phase commit protocol.
Figure 7B:
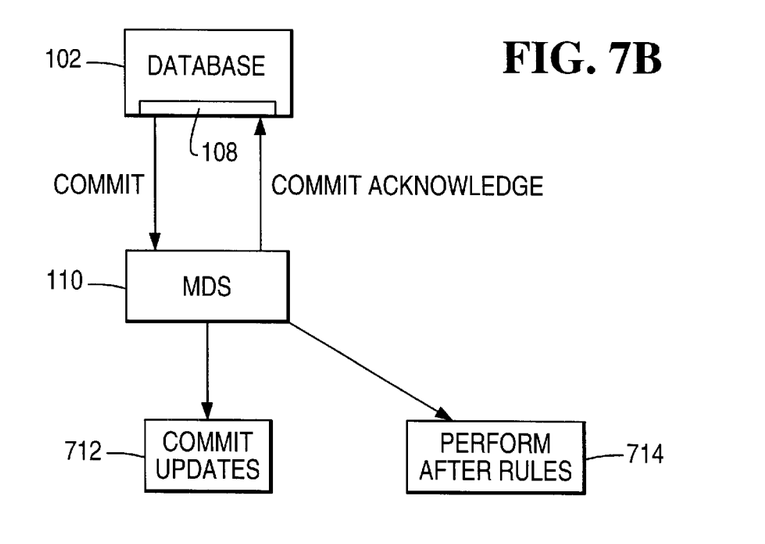

FIGS. 7A–7B illustrate a two-phase commit protocol of the present invention. This protocol supports the imposition of both predicate (before commit) rules and subsequent (after commit) rules. As shown in FIG. 7A, the process begins when the DBA 104 sends a message to the database 102. As described earlier, the message is typically expressed in a data description language (DDL). The message is then provided to the MDS 110 for subsequent processing. First, the message is processed by the replication service (RS) 108, and a prepare statement is sent from the RS 108 to the MDS 110. The MDS changes to a prepare state, and writes a transaction identification and an MDS 110 state type to a log. The MDS prepare state indicates the status of the MDS in the transaction. The MDS then parses the DDL, as shown in block 704, and determines the appropriate changes to make to the metadata. Before the metadata changes are committed, the MDS 110 invokes an integrity routine to determine if the metadata changes are permissible under the "before" rules.

If the requested changes are permitted (the proposed metadata changes do not violate integrity), the metadata is updated, as shown in block 708, and a prepare acknowledgement message is sent from the MDS 110 to the replication service 108. If the changes will violate integrity, the MDS 110 sends an abort message back to the replication service 108.

FIG. 7B is an operational flow illustrating the commit phase of the two-phase protocol. If the replication service 108 received a prepare acknowledge message from the MDS 110 (indicating that the proposed changes are permitted), a commit message is sent from the replication service 108 to the MDS 110. The MDS 110 then commits the transactions. After the transaction is fully committed, the MDS 110 sends a commit acknowledgement to the replication service 108.

Figure 8:
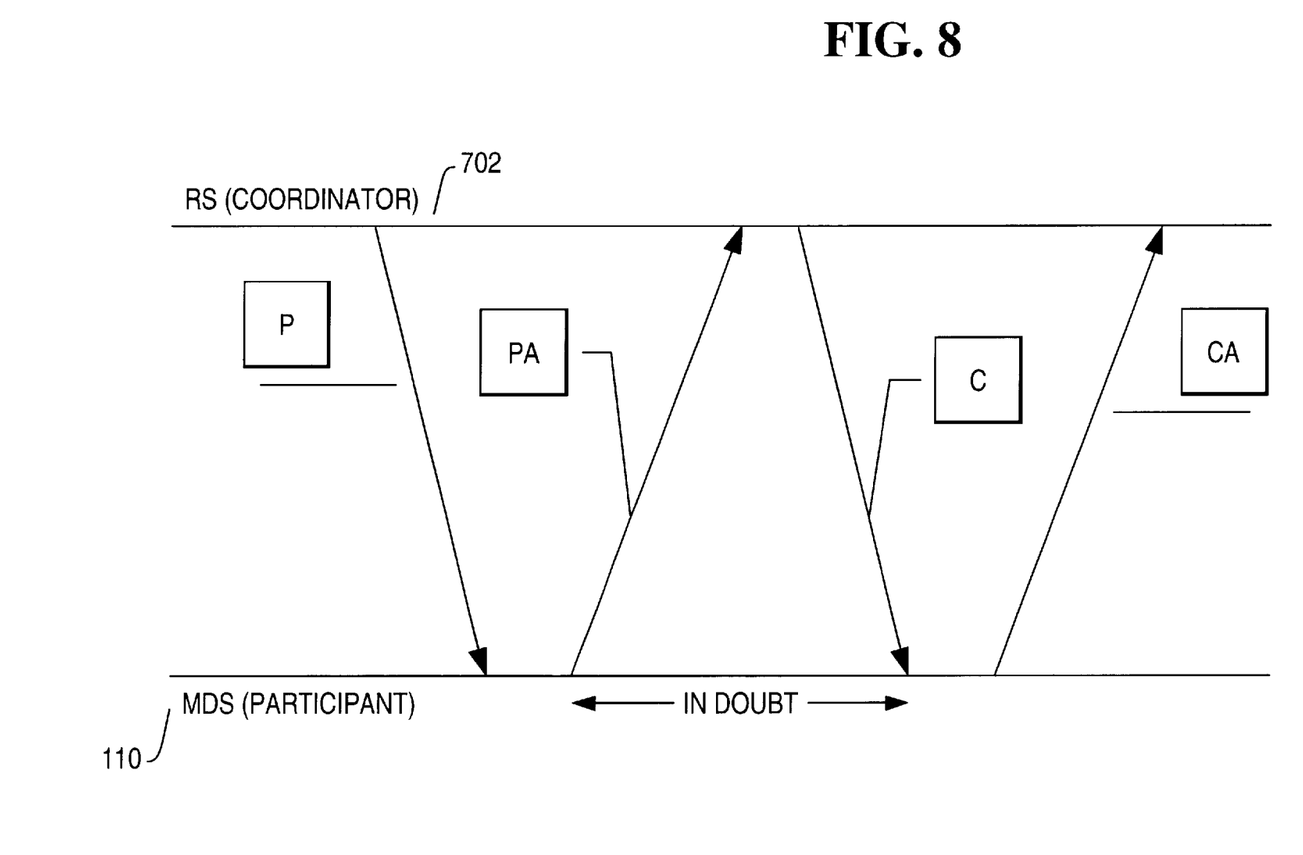
FIG. 8 is a diagram summarizing the two-phase commit protocol and message traffic.

FIG. 8 is a diagram summarizing the two phase commit protocol and the message transfers between the replication service 108 and the MDS 110. One phase commit processing may be implemented as well. In this embodiment, the replication service 108 changes to a prepare state and sends a commit message to the MDS 110. Then, the MDS 110 writes the transaction identification and its state type to a log. The MDS 110 then parses the DDL and determines the appropriate changes to be made to the metadata repository, and invokes the integrity routine to determine if the changes will be allowed. If the changes do not violate integrity, then the MDS 110 sends a commit message back to the replication service 108. If the changes violate integrity, the MDS 110 sends an abort message back to the replication service 108. Then, the replication service 108 commits or aborts (depending on the outcome of the integrity check), before sending an acknowledgement.

Figure 9:
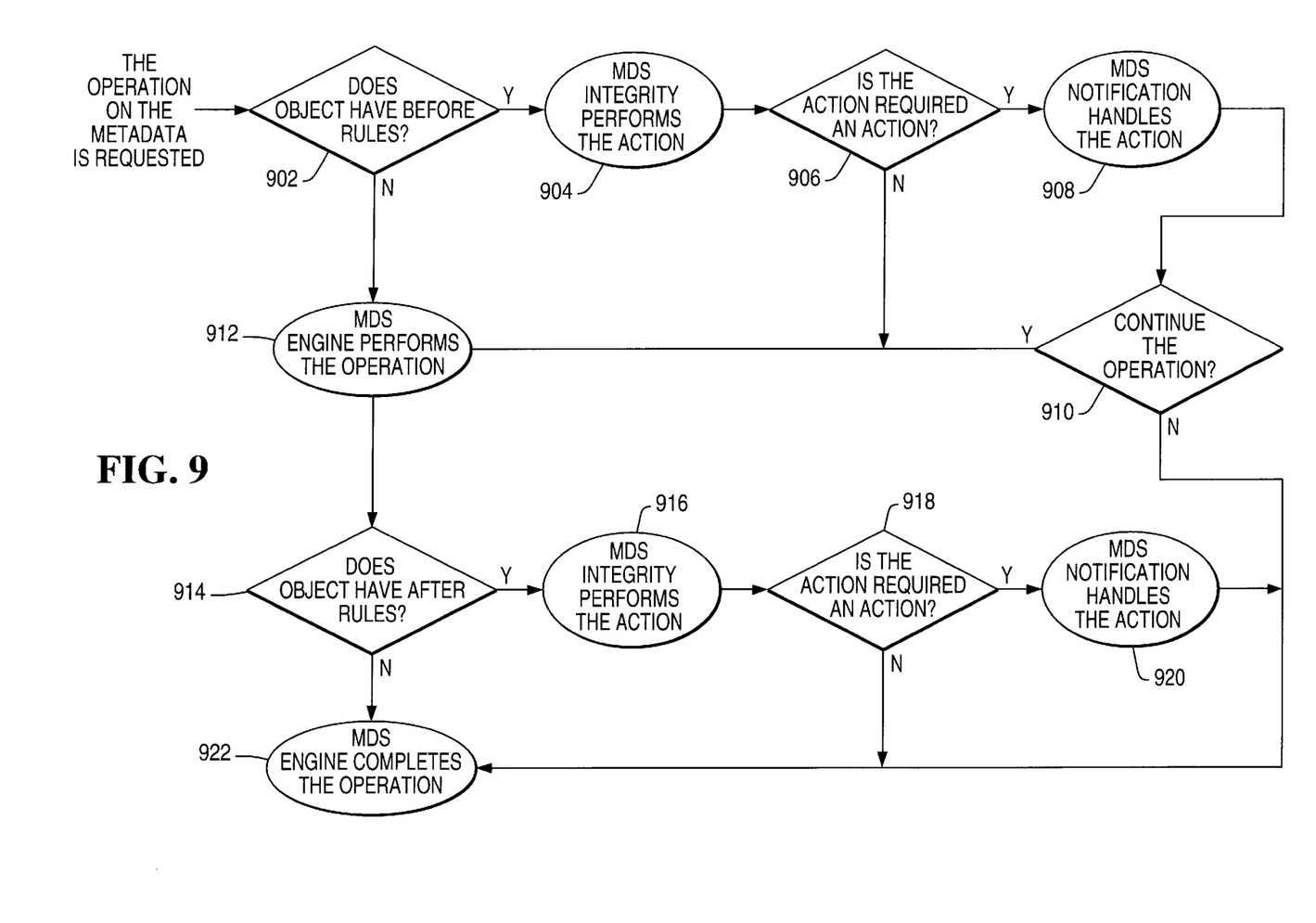
FIG. 9 is a flow diagram further illustrating the operations performed in the integrity routine invoked by the metadata service.

FIG. 9 is a flow diagram further illustrating the operations performed in the integrity routine invoked by the MDS. If an operation on the metadata is requested, and the object has predicate (before) rules, the MDS 110 performs an integrity check based on the predicate rules. These steps are depicted in blocks 902 and 904. If the rule indicates that an action is required, the action is handled by the MDS 110. Block 908 shows this operation where the action indicated by the rules is one of notification. If an action is not required or if there are no before rules, the requested operation is performed by the MDS 110 engine, as shown in block 912.

Next, the subsequent or "after" rules are checked. If the object has after rules, the MDS 110 performs the actions indicated by the after rules. This is depicted in blocks 914 and 916. If the action is required, it is handled by the MDS 110. This is shown in blocks 918 and 920. If no action is required, the MDS 110 engine completes the requested operation 922.

Figure 10:
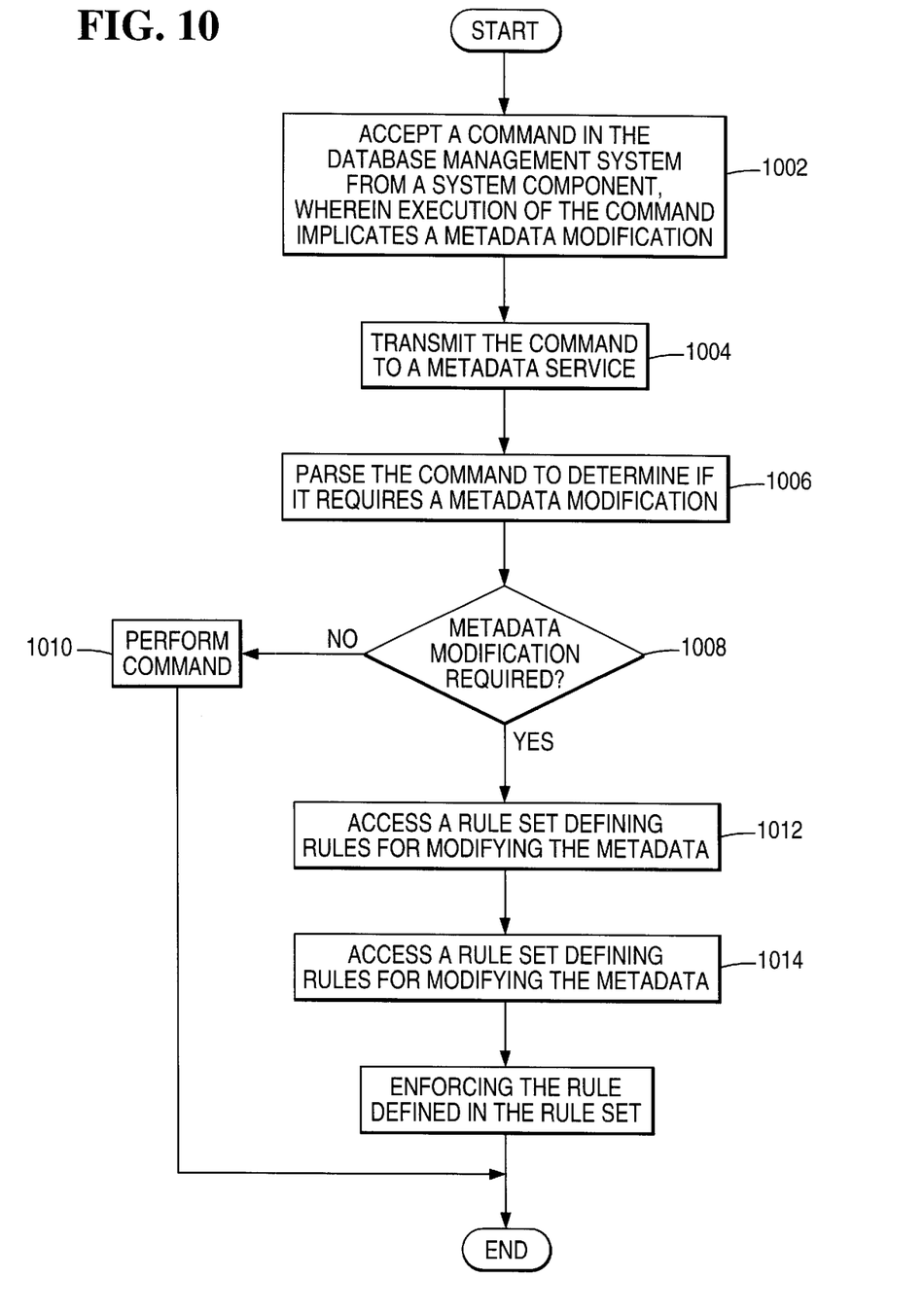
FIG. 10 is a flow chart summarizing the operations performed in practicing an embodiment of the present invention.

FIG. 10 is a flow chart summarizing the operations performed in practicing an embodiment of the present invention. The process begins by accepting a command in the database management system 102 from a system component such as the database administrator 102, and transmitting that command or a processed form of the command to a metadata service, as depicted in blocks 1002 and 1004. Then, the command is parsed to determine if a metadata modification is implicated 1006. If a metadata modification is not required to perform the command, the command is simply performed 1010. If metadata modification is required to perform the command, a rule set is accessed, as depicted in block 1012. The rule set defines rules for modifying the metadata, including actions to be taken by the MDS 110. These actions can be classified by any combination of object type, operation type, command type, modification type, which applications or components are affected by the proposed change, or according to how severe the metadata modification is.

CONCLUSION

This concludes the description of the preferred embodiments of the present invention. In summary, the present invention describes a method, apparatus, and article of manufacture for managing metadata in a database management system.

The method comprises the steps of accepting a command in the database management system that implicates a metadata modification and providing that command to a metadata service, parsing the command to determine if the command requires a metadata modification, accessing a rule set defining rules for modifying the metadata when indicated by the parsed commands, and enforcing the rule defined in the rule set. The article of manufacture comprises a program storage device with a medium tangibly embodying processing instructions for performing the foregoing operations.

The apparatus comprises a means for performing the foregoing steps. The article of manufacture comprises a means for performing these steps, including a computer implementing a database management system. A special purpose processor or a single multipurpose computer can perform the functions herein described. Alternatively, the operations disclosed herein can be performed among a number of computers communicatively interconnected by a network such as a local area network, wide area network, or the Internet.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of managing metadata in a database management system, comprising the steps of:

accepting a command in the database management system from a system component, wherein execution of the command implicates a metadata modification;

transmitting the command to a metadata service;

parsing the command to determine if the command requires a metadata modification;

accessing a rule set defining rules for modifying the metadata when the command requires a metadata modification, wherein the rule set includes a rule requiring negotiation of the metadata modification between the system component and a second system component accessing the database management system; and enforcing the rule defined in the rule set.

2. The method of claim 1, wherein the metadata modification is categorized into a metadata modification type and the rule comprises the metadata modification type.

3. The method of claim 1, wherein the rule set comprises predicate rules which are enforced before the metadata change is prepared and subsequent rules which are enforced after the metadata change is committed.

4. The method of claim 1, wherein the rule set comprises a notify rule to notify a second system component of the metadata modification and to allow the metadata modification if the second system component approves.

5. The method of claim 1, wherein the rule set comprises an alert rule to alert a second system component of the metadata modification.

6. The method of claim 1, wherein the rule set comprises a block rule to block the metadata modification.

7. The method of claim 1, further comprising the steps of:

accepting a suspend request associated with a rule in the metadata service;

suspending the rule specified by the suspend request; and notifying a second system component of the suspended rule.

8. The method of claim 1, further comprising the step of transmitting an outcome of the command from the database management system.

9. The method of claim 1, wherein the database command affects the database management system schema.

10. The method of claim 1, wherein the command is transmitted to the metadata service via a replication service.

11. The method of claim 1, wherein the command is described by a database definition language.

12. The method of claim 1, wherein the rule set is stored as a table in the database management system.

13. The method of claim 1, wherein the command transmitted to the metadata services is a prepare command transmitted via a request coordinator in the relational database management system, and the step of enforcing the rule defined in the rule set comprises the steps of:

transmitting a prepare acknowledgement message from the metadata service, receiving a commit message in the metadata service, and transmitting a commit acknowledgement message from the metadata service when the rule allows the metadata modification; and transmitting an abort message from the metadata service and receiving an abort message in the metadata service when the rule does not allow the metadata modification.

14. An apparatus for managing metadata in a database management system, comprising:

means for receiving a command from a system component in a metadata service, wherein execution of the command implicates a metadata modification;

means for parsing the command to determine if the command requires a metadata modification;

means for accessing a rule set defining rules for modifying the metadata when the command requires a metadata modification, wherein the rule set includes a rule requiring negotiation of the metadata modification between the system component and a second system component accessing the database management system; and means for enforcing the rule defined in the rule set.

15. The apparatus of claim 14, wherein the metadata modification is categorized into a metadata modification type and the rule comprises the metadata modification type.

16. The apparatus of claim 14, wherein the rule set comprises predicate rules which are enforced before the metadata change is prepared and subsequent rules which are enforced after the metadata change is committed.

17. The apparatus of claim 14, wherein the rule set comprises a notify rule to notify a second system component of the metadata modification and to allow the metadata modification if the second system component approves.

18. The apparatus of claim 14, wherein the rule set comprises an alert rule to alert a second system component of the metadata modification.

19. The apparatus of claim 14, wherein the rule set comprises a block rule to bock the metadata modification.

20. The apparatus of claim 14, further comprising:
   means for accepting a suspend request associated with a rule in the metadata service;
   means for suspending the rule specified by the suspend request; and
   means for notifying a second system component of the suspended rule.

21. The apparatus of claim 14, further comprising means for transmitting an outcome of the command from the database management system.

22. The apparatus of claim 14, wherein the database command affects the database management system schema.

23. The apparatus of claim 14, wherein the command is transmitted to the metadata service via a replication service.

24. The apparatus of claim 14, wherein the command is described by a database definition language.

25. The apparatus of claim 14, wherein the rule set is stored as a table in the database management system.

26. The apparatus of claim 14, wherein the command transmitted to the metadata services is a prepare command transmitted via a request coordinator in the relational database management system, and the step of enforcing the rule defined in the rule set comprises the steps of:
   transmitting a prepare acknowledgement message from the metadata service, receiving a commit message in the metadata service, and transmitting a commit acknowledgement message from the metadata service when the rule Allows the metadata modification; and
   transmitting an abort message from the metadata service and receiving an abort message in the metadata service when the rule does not allow the metadata modification.

27. A program storage device, readable by computer having a processor and a memory, tangibly embodying one or more programs of instructions executable by the computer to perform the method steps of managing metadata in a database management system, the method steps comprising the steps of:
   accepting a command in the database management system from a system component, wherein execution of the command implicates a metadata modification;
   transmitting the command to a metadata service;
   parsing the command to determine if the command requires a metadata modification;
   accessing a rule set defining rules for modifying the metadata when the command requires a metadata modification, wherein the rule set includes a rule requiring negotiation of the metadata modification between the system component and a second system component accessing the database management system; and
   enforcing the rule defined in the rule set.

28. The program storage device of claim 27, wherein the metadata modification is categorized into a metadata modification type and the rule comprises the metadata modification type.

29. The program storage device of claim 27, wherein the rule set comprises predicate rules which are enforced before the metadata change is prepared and subsequent rules which are enforced after the metadata change is committed.

30. The program storage device of claim 27, wherein the rule set comprises a notify rule to notify a second system component of the metadata modification and to allow the metadata modification if the second system component approves.

31. The program storage device of claim 27, wherein the rule set comprises an alert rule to alert a second system component of the metadata modification.

32. The program storage device of claim 27, wherein the rule set comprises a block rule to bock the metadata modification.

33. The program storage device of claim 27, wherein the method steps further comprise the steps of:
   accepting a suspend request associated with a rule in the metadata service;
   suspending the rule specified by the suspend request; and
   notifying a second system component of the suspended rule.

34. The program storage device of claim 27, wherein the method steps further comprise the step of transmitting an outcome of the command from the database management system.

35. The program storage device of claim 27, wherein the database command affects the database management system schema.

36. The program storage device of claim 27, wherein the command is transmitted to the metadata service via a replication service.

37. The program storage device of claim 27, wherein the command is described by a database definition language.

38. The program storage device of claim 27, wherein the rule set is stored as a table in the database management system.

39. The program storage device of claim 27, wherein the command transmitted to the metadata services is a prepare command transmitted via a request coordinator in the relational database management system, and the method step of enforcing the rule defined in the rule set comprises the method steps of:
   transmitting a prepare acknowledgement message from the metadata service, receiving a commit message in the metadata service, and transmitting a commit acknowledgement message from the metadata service when the rule allows the metadata modification; and
   transmitting an abort message from the metadata service and receiving an abort message in the metadata service when the rule does not allow the metadata modification.

* * * * *